United States Patent [19]

Horie et al.

[11] Patent Number: 4,719,377
[45] Date of Patent: Jan. 12, 1988

[54] ARMATURE ANNULAR CORE

[75] Inventors: Hiromichi Horie, Yokosuka; Kumi Ochiai, Yokohama; Itsuo Arima, Kawasaki; Mikio Morita, Yokohama, all of Japan

[73] Assignee: Kabushiki Kaisha Toshiba, Kawasaki, Japan

[21] Appl. No.: 781,886

[22] Filed: Sep. 30, 1985

[30] Foreign Application Priority Data

Sep. 29, 1984 [JP] Japan .................... 59-204869
Dec. 25, 1984 [JP] Japan .................... 59-271706

[51] Int. Cl.⁴ ............................................ H02K 15/12
[52] U.S. Cl. ...................................... 310/44; 310/214; 310/268
[58] Field of Search ......................... 310/44, 214, 268

[56] References Cited

U.S. PATENT DOCUMENTS 2,758,231  8/1956  Welter .................. 310/44 X
3,489,938  1/1970  Nakamura ............... 310/214
3,872,334  3/1975  Loubier ................. 310/44 X
4,255,494  3/1981  Reen et al. ............. 310/44 X
4,503,368  3/1985  Sakamoto ............... 310/44 X

FOREIGN PATENT DOCUMENTS 47-22514  6/1972  Japan .
1307831   2/1973  United Kingdom .
1364684   8/1974  United Kingdom .

Primary Examiner—Donovan F. Duggan
Attorney, Agent, or Firm—Oblon, Fisher, Spivak, McClelland, & Maier

[57] ABSTRACT

An annular core used in a so-called air axial gap motor includes a magnetic and structural gap along the axial direction. By using a compressed molded body of a mixture of a magnetic metal powder and an electrically insulating resin as major constituents, an annular molded body and a molded plate are prepared. The annular molded body has slots and teeth alternately formed along the circumferential direction. The molded plate closes the upper portions of the slots to constitute a fully closed slot structure.

15 Claims, 11 Drawing Figures

ARMATURE ANNULAR CORE

BACKGROUND OF THE INVENTION

The present invention relates to an annular core used in a so-called axial air gap motor with a magnetic and structural gap along an axial direction thereof.

An armature with semi-closed slots in a conventional axial air gap motor (to be referred to as an AAG motor hereinafter) has an annular core 1 and an armature winding 2 wound therearound, as shown in FIG. 1. The core 1 used in the armature has T-shaped teeth 3 and slots 4 formed therebetween. Each slot 4 has a narrow upper opening to constitute a semi-closed slot, thereby decreasing slot ripple loss.

In order to manufacture such an annular core 1, an electromagnetic steel sheet is punched to form a profile defining slots 4 and the pressed plate is wound to constitute the core 2, as shown in FIG. 2.

When the core 1 described above is used in a high-speed AAG motor driven with AC power at a frequency high than a commercial frequency or in a variable speed AAG motor driven by a variable voltage variable frequency power source (to be referred to be as a VVVF power source) controlled by pulse width modulation (to be referred to as PWM hereinafter), large audible frequency noise caused by magnetic distortion and vibration of the magnetic steel plate occurs, resulting in inconvenience.

SUMMARY OF THE INVENTION

The present invention has been made in consideration of the above situation, and has as its object to provide an armature annular core in a motor which has minimum slot ripple loss and minimum eddy current loss at a high frequency.

In order to achieve the above object of the present invention, there is provided an annular core for an armature, comprising: an annular molded body consisting of a compressed molded body of a mixture of a magnetic metal powder and an electrically insulating resin so as to constitute slots and teeth; a molded plate fitted to close upper portions of the slots of the annular molded body; and a winding mounted in the slots of the annular molded body, thereby constituting a fully closed slot structure.

The magnetic metal powder used in the present invention may be selected from pure iron powder, or iron-alloy powder, e.g., an Fe-Si alloy powder, Fe-3Si, an Fe-Al alloy powder, an Fe-Si-Al alloy powder, an Fe-Ni alloy powder, and an Fe-Co alloy powder. These powders may be used singly or in the form of a mixture.

The electrically insulating resin used in the present invention covers the surfaces of the iron or ferro alloy particles to provide a sufficiently high electrical resistance and to electrically insulate the particles from each other, thereby decreasing eddy current loss upon AC magnetization of the core. At the same time, the electrically insulating resin serves as a binder to bind the magnetic metal particles. The resin can be exemplified by epoxy resin, polyamide resin, polyimide resin, polyester resin and the like. The resins can be used singly or in the form of a mixture.

When an inorganic compound powder is mixed in the resin, the magnetic permeability and magnetic flux density of the resultant body as the core can be improved. Therefore, the resin defined herein is not limited to only a resin but can also be a resin material containing an inorganic compound powder. The inorganic compound powder can be selected from electrically insulating powder materials such as $Al_2O_3$, $SiO_2$, $CaCO_3$, $CaSiO_3$, glass powder, mica powder, or a mixture thereof.

A content of the inorganic compound powder is preferably 2 to 70% by volume of the resin material containing the inorganic compound powder in consideration of its effect. A particle size of the inorganic compound is preferably 20 $\mu$m or less.

A mixting ratio of the resin to the magnetic metal powder is preferably 1.5% by volume or more so as to completely insulate the metal particles from each other and to bond the particles sufficiently. When the content of the resin is increased, the magnetic permeability and magnetic flux density of the core are decreased. For this reason, in an annular molded body with slots and teeth, the content of the magnetic metal powder is preferably 60% by volume or more. Furthermore, since the molded plate serves as a magnetic wedge, it preferably has a magnetic permeability lower than that of the annular molded body. The volume ratio of the magnetic metal powder in the molded plate is preferably smaller than that in the annular molded body so as to achieve the effect of the present invention. Since the magnetic wedge normally has a specific magnetic permeability of 50 (about 62.5 $\mu$H/m in units of SI) or less, the content of the magnetic metal powder in the molded plate is preferably 70% by volume or less. However, when the content of the magnetic metal powder is less than 10% by volume, the powder cannot serve as a magnetic wedge. Therefore, the content of the magnetic metal powder in the molded plate preferably falls within the range between 10% and 70% of the total volume.

When a coupling agent is added in an amount of 0.3% by volume or more to a mixture of the magnetic metal powder and the resin as major constituents of the core before compression molding is performed, high-frequency loss of the core can be further decreased. The coupling agent can be selected preferably from a titanium coupling agent, a silane coupling agent, an aluminum coupling agent and a zirconium coupling agent. An indium coupling agent, a chromium coupling agent or the like can also be used as the coupling agent. The titanium coupling agent comprises a titanium compound having at least one hydrolyzable group (R) and at least one nonhydrolyzable lipophilic group (X) which are bonded to a titanium atom (Ti) and is represented by the following general formula:

Since the normal coordination number of titanium is 4 or 6, m+n in the above formula must be 4 to 6 and must satisfy condition $1 \leq m \leq 4$. The hydrolyzable group R can be monoalkoxy group, a residue of acetic oxyacid, or a residue of ethylene glycol. The group R easily reacts with moisture adsorbed in the surface of the magnetic powder at room temperature and is hydrolyzed, so that titanium atoms (Ti) of the titanium coupling agent are firmly bonded to the surfaces of the magnetic particles through oxygen atoms (O).

X is at least one lipophilic group with hydrocarbon radical, which does not react with a hydroxyl group on the surface of the magnetic powder, and has excellent wetting property and high adhesion strength with a binder resin which is an organic material.

The silane coupling agent is a silane compound represented by the general formula below:

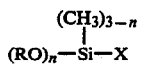

Silicon has a coordination number of 4, so that n is 2 or 3. RO is an alkoxy group exemplified by methoxy group or ethoxy group which can be hydrolyzed with moisture in air or adsorbed in the surface of the magnetic powder to produce a silanol group (SiOH), so that the silicon atoms Si are bonded to the surface of the magnetic powder through oxygen atoms O.

X is an organic functional group with an epoxy group, methacrylate group or amino group and has excellent wetting property and high adhesion strength with the binder resin which is an organic material.

The zirconium coupling agent comprises a zirconium compound having at least one hydrolyzable group (R) and at least one nondydrolyzable lipophilic group (X) which are bonded to a zirconium atom (Zr) and is represented by the general formula below:

Since zirconium has a coordination number of 4, m+n in the above formula must be 4 and must satisfy condition $1 \leq m \leq 3$. The hydrolyzable group R can be monoalkoxy group, a residue of acetic oxyacid, or a residue of ethylene glycol. The group R easily reacts with moisture adsorbed in the surface of the magnetic powder at room temperature and is hydrolyzed, so that zirconium atoms (Ti) of the zirconium coupling agent are firmly bonded to the surfaces of the magnetic particles through oxygen atoms (O).

X is at least one lipophilic group with hydrocarbon radical, which does not react with a hydroxyl group on the surface of the magnetic powder, and has excellent wetting property and high adhesion strength with a binder resin which is an organic material.

A method of manufacturing the annular core according to the present invention will be described hereinafter.

A magnetic metal powder is sufficiently mixed with an electrically insulating resin at desired ratios for the annular molded body and the molded plate. The mixtures are filled in the corresponding molds and are compression molded at a pressure of 1,000 MPa or less which can be easily achieved industrially, thereby preparing the annular molded body and the molded plate.

In the annular molded body, slots and teeth are alternately formed along the circumferential direction. The molded plate has a shape to close the openings of the slots.

The molded plate may comprise a plate or a plurality of split members. When a plate is used, it closes all the slots. However, when the split members are used, they correspond to the respective slots. The armature coil is formed through the slots in the annular molded body, and the molded plate is bonded to close the upper portion of the slots of the annular molded body, thereby preparing the annular core with a fully closed slot structure.

The annular molded body and the molded plate may be heat-treated at a temperature of 300° C. before or after bonding. The annular molded body can be bonded to the molded plate through an adhesive layer. Alternatively, a thermoplastic resin is used in the molded members, the molded plate is located on the slots of the annular molded body, and the resultant structure is heated to bond them through the resin.

BRIEF DESCRIPTION OF THE DRAWINGS

FIGS. 3 to 5 are respectively perspective views showing an annular core according to an embodiment of the present invention, in which FIG. 3 is a perspective view showing an armature of an AAG motor, and FIGS. 4 and 5 are respectively perspective views showing an annular core of the armature of FIG. 3;

DETAILED DESCRIPTION OF THE PREFERRED EMBODIMENT

EXAMPLE 1

Figure 1:
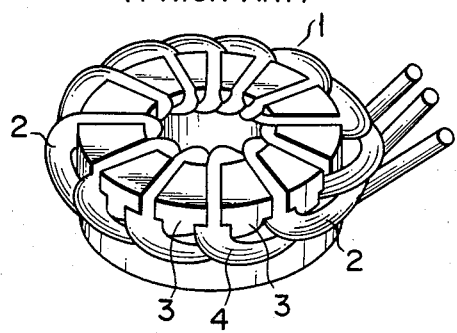
FIGS. 1 and 2 are respectively perspective views showing a conventional annular core.

A pure iron powder having an average particle size of 150 μm and epoxy resin were mixed at a volume ratio of 98:2. The resultant mixture was filled in molds and was compression molded at a pressure of 600 MPa to prepare an annular molded body 5 of FIG. 4 and a molded plate 6 of FIG. 5.

The body 5 and the plate 6 were annealed at a temperature of 200° C. for an hour. A winding 2 was mounted in the slots 4 of the body 5, and then the plate 6 was bonded by an epoxy resin adhesive on the upper surface of the resultant structure, thereby constituting a fully closed slot structure and hence the core 1 with the windings 2.

By using the resultant core, a 4-pole axial air gap hysteresis synchronous motor was prepared. The motor had a 200-W rated output at a speed of 21,600 rpm.

Figure 2:
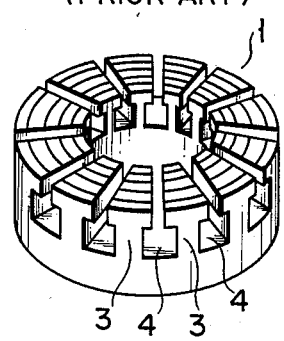
Figure 3:
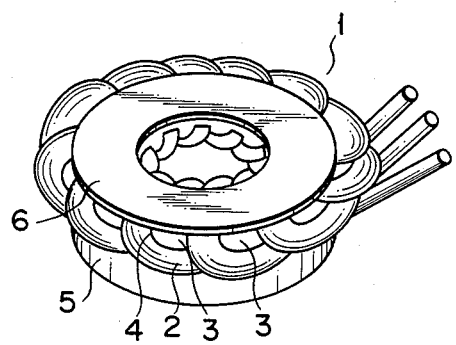

As Comparative Example 1, an armature shown in FIG. 1 was prepared by using the annular core of FIG. 2 to prepare a hysteresis synchronous motor.

Noise generated by the motor using the annular core of Example 1 upon operation for the rated output could be decreased by 6 dB as compared with that of the motor in Comparative Example 1.

Figure 6:
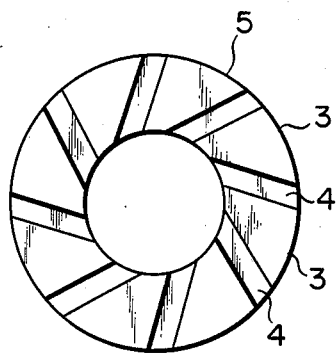
FIG. 6 is a plan view of another annular molded body according to the present invention.
Figure 7:
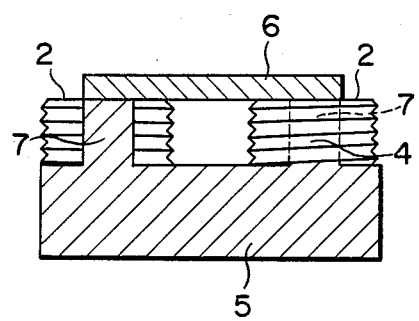
FIG. 7 is a longitudinal sectional view of another armature according to the present invention.

The annular molded body 5 may have another shape. For example, the slots shown in FIG. 6 comprise a plurality of involute slots. With this arrangement, torque variations can be decreased in a motor using such an annular core. Another modification may also be proposed. As shown in FIG. 7, annular projections 7 are formed on the upper surface of an annular molded body 5, and slots 4 and teeth 3 are alternately formed in the projections 7. A winding 2 is mounted in the slots 4, and a thin molded ring plate 6 having the same width as that of the annular projection 7 is bonded to the projections 7.

EXAMPLE 2

An Fe-0.5%Si alloy powder having an average particle size of 70 μm was mixed with polyamide resin at a volume ratio of 90:10. The resultant mixture was filled in the molds and was compression molded to prepare an annular molded body 5 of FIG. 4 and a molded plate 6 of FIG. 5 in the same manner as in Example 1. An armature winding 2 was mounted in slots, and the body 5 and the plate 6 were stacked, annealed and bonded, thereby preparing a core 1 with the winding 2.

A motor having the same specifications as in Example 1 was prepared by using the core of Example 2. When the motor was operated at the rated speed and the rated output, noise was decreased by 8 dB as compared with the motor in Comparative Example 1.

EXAMPLE 3

Pure iron powder having an average particle size of 120 μm was mixed with semi-hardened epoxy resin powder at a volume ratio of 98:2. The resultant mixture was filled in the molds and was compression molded at a pressure of 600 MPa to prepare an annular molded body of FIG. 4. Meanwhile, pure iron powder having an average particle size of 120 μm was mixed with semi-hardened epoxy resin at a volume ratio of 40:60, and the resultant mixture was filled in other molds and was compression molded at a pressure of 500 MPa to prepare a molded plate 6 of FIG. 8. The resultant molded members were annealed at a temperature of 200° C. for an hour, thereby hardening the semi-hardened epoxy resin.

Figure 4:
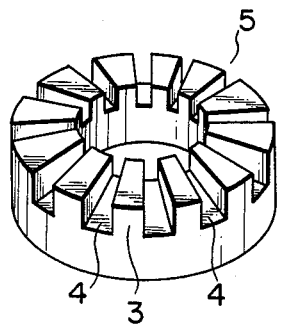
Figure 5:
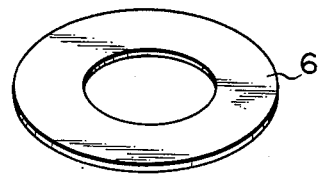

After annealing, a winding was mounted in slots 2 of the annular molded body 5 of FIG. 4. The molded plate of FIG. 8 was adhered by an epoxy resin adhesive to close the upper portions of the slots at the teeth 3, thereby fixing the winding and constituting a fully closed slot structure. As a result, the annular core was prepared.

The resultant core was used as an armature together with a semi-hardened magnetic rotor to prepare a 4-pole axial air gap hysteresis synchronous motor having a 200-W rated output at a speed of 21,600 rpm.

Figure 9:
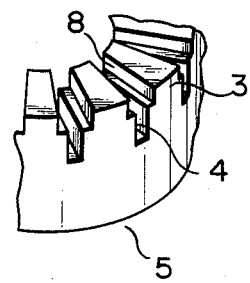
FIG. 9 is a partial perspective view of still another annular molded body used in the present invention.

As a comparison, an annular core obtained by winding a 0.35-mm thick electromagnetic steel plate, as shown in FIG. 2, was used to prepare an armature of FIG. 9, and an axial air gap hysteresis synchronous motor having the same ratings as the motor in Example 3 was assembled. When the motor was operated in the rated frequency and the rated output, noise in the audible frequency range of the armature was decreased by about 6 dB as compared with that in Comparative Example 1. In this case, a PWM-controlled VVVF power source was used.

EXAMPLE 4

An Fe-1%Si alloy powder having an average particle size of 70 μm was used as a magnetic metal powder. A resin material was a semi-hardened epoxy resin powder obtained by mixing $SiO_2$ microparticles with an average size of 2 μm in the resin at a volume ratio of 20% of the total volume of the resultant resin material. The magnetic metal powder was mixed with the resin material at volume ratios of 95:5 and 65:35. The mixture having the ratio of 95:5 was used to prepare an annular molded body of FIG. 4. The mixture having the volume ratio of 65:35 was used to prepare a molded plate of FIG. 6. The compression molding pressure was 700 MPa. The resultant molded members were annealed at a temperature of 200° C. for an hour. The winding, the molded body and the molded plate were assembled in the same manner as in Example 3 to prepare an annular core with the armature winding. This core was used as the armature to assemble a hysteresis synchronous motor having the same ratings as the motor in Example 3.

The motor in Example 4 was operated at the rated speed and the rated output, and noise in the audible frequency range of the armature was decreased by about 7 dB as compared with the motor in Comparative Example 1.

EXAMPLE 5

A pure iron powder having an average particle size of 150 μm was mixed with polyamide resin at a volume ratio of 88:12. The resultant mixture was compression molded by molds at a pressure of 700 MPa to prepare an annular molded body of FIG. 7. Meanwhile, an Fe-3%Si alloy powder having an average particle size of 56 μm was mixed with polyamide resin at a volume ratio of 65:35, and the resultant mixture was compression molded at a pressure of 400 MPa to prepare a molded plate of FIG. 6.

Figure 8:
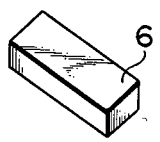
FIG. 8 is a perspective view of still another armature according to the present invention.

An armature winding was mounted in the annular molded body, and the molded plates were fitted in steps 8 of teeth of the annular molded body of FIG. 7. The resultant structure was annealed and bonded, thereby obtaining a core whose partial side view is illustrated in FIG. 8. The armature winding is omitted in FIG. 8. A hysteresis synchronous motor having the same ratings as in Example 3 was assembled.

The motor in Example 5 was operated at the rated speed and the rated output. Noise in the audible frequency range was decreased by about 6 dB as compared with that in Comparative Example 1.

EXAMPLE 6

A pure iron powder having an average particle size of 105 μm was mixed with semi-hardened epoxy resin at a volume ratio of 94:6. The semi-hardened epoxy resin contained 30% by volume of $CaSiO_3$ having a particle size of 4 μm or less. The resultant mixture was filled in molds and was compression molded at a pressure of 700 MPa, thereby obtaining an annular molded body of FIG. 9.

The same pure iron and resin as described above were used, but a mixing ratio was 60:40. The resultant mixture was compression molded at a pressure of 400 MPa to prepare a molded plate of FIG. 6.

An armature winding was mounted in the annular molded body, and the molded plates were fitted in steps 8 of the teeth of the molded body of FIG. 7, thereby obtaining the core of FIG. 8.

Figure 11:
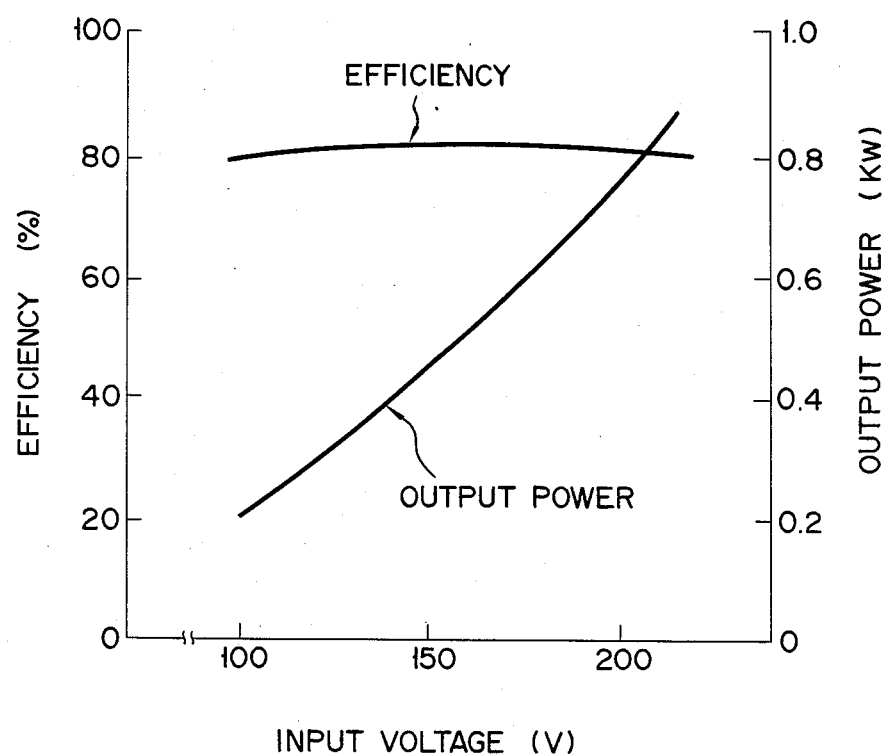
FIG. 11 is a graph showing the electrical characteristics of the core.

By using an armature using the resultant core, a 6-pole hysteresis synchronous motor having the rated speed of 21,600 rpm was assembled. A synchronous pull-out output power was about 750 W at a power source voltage of 200 V. The voltage-output-power-efficiency characteristics of the motor are illustrated in FIG. 11.

Figure 10:
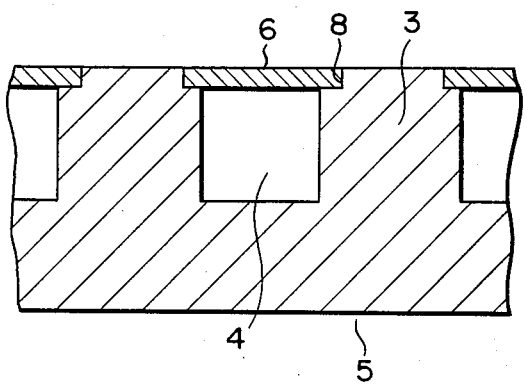
FIG. 10 is a partial side view of the body shown in FIG. 9.

As Comparative Example 2, an armature of FIG. 9 was prepared by using the annular core obtained by winding the 0.35-mm thick electromagnetic steel sheet of FIG. 10. A hysteresis synchronous motor was prepared by using this armature. The motor had the same rated speed and output as those of the motor of Example 6.

EXAMPLE 7

A portion of the mixture for the annular core of Example 6 was substituted with a Ti coupling agent to prepare a mixture of the pure iron powder, the resin and the Ti coupling agent at a volume ratio of 94:5.3:0.7. A core was prepared by using this mixture in the same manner as in Example 6.

A mixture of the pure ion powder, the resin and the Ti coupling agent of the molded plate had a volume ratio of 60:38:2. The molded plate was prepared in the same manner as in Example 6.

A motor having the same ratings as in Example 6 was assembled by using the above molded members.

The motors in Examples 6 and 7 and Comparative Example 2 were operated with a power source voltage of 200 V at the rated speed of 21,600 rpm and the rated output of 600 W by using a PWM-controlled VVVF power source. Noise in the motors of Examples 6 and 7 was decreased by 8 dB as compared with that in Comparative Example 2.

The motor efficiency was measured as follows: 80.5% in Example 6; 82% in Example 7; and 76% in Comparative Example 2. The loss of the motors was thus measured as follows: 19.5% in Example 6; 18% in Example 7; and 24% in Comparative Example 2.

Furthermore, temperature rises of the cores were also measured. The core in Example 7 had a minimum temperature rise while the core in Comparative Example 2 had a maximum temperature rise.

As may be apparent from the above description, when the annular core of the present invention is used in an AAG motor driven with AC power including a frequency component of an audible frequency, especially, a high-speed AAG motor driven at a frequency slightly higher than the commercial frequency, or a variable speed AAG motor driven with a PWM-controlled VVVF power source, or when the annular core is used in an armature in a pulse-driven axial air gap stepping motor, noise can be greatly decreased as compared with the conventional core made of an electromagnetic plate. Furthermore, according to the present invention, since the fully closed slot type armature can be easily prepared, the winding can be easily fixed and slot ripple loss can be minimized. Furthermore, the annular core of the present invention comprises a compressed molded body of a mixture of a magnetic metal powder and an electrically insulating resin. Therefore, an eddy current loss at a high frequency can be decreased as compared with the electromagnetic steel plate having a thickness of 0.3 to 0.5 mm, thereby minimizing loss in PWM control.

What is claimed is:
1. An armature annular core comprising:
   an annular molded body comprising:
   a compressed molded body of a mixture of a magnetic metal powder and an electrically insulating resin as major constituents, said annular molded body being provided with slots and teeth alternately formed on an upper surface of said compressed molded body along a circumferential direction thereof;
   a winding mounted in said slots; and
   a molded plate comprising a compressed molded body of a mixture of a magnetic metal powder and an electrically insulating resin as major constituents, said molded plate being adapted to close upper portions of said slots of said annular molded body to constitute a fully closed slot structure wherein said resin comprises:
   an inorganic compound powder selected from the electrically insulated powder materials contained in the group of $Al_2O_3$, $SiO_2$, $CaCO_3$, $CaSiO_3$, glass powder, mica powder and mixtures of the compounds in this group.

2. An armature core as in claim 1 further comprising:
   a coupling agent added to the mixture of said magnetic metal powder and said resin wherein said coupling agent is selected from the group of a titanium coupling agent, a silane coupling agent, an aluminum coupling agent, a zirconium coupling agent, an indium coupling agent or a chromium coupling agent.

3. An armature annular core comprising:
   a compressed molded body of a mixture of a magnetic metal powder and an electrically insulating resin as major constituents, said annular molded body being provided with slots and teeth alternatively formed on an upper surface of said compressed molded body along a circumferential direction thereof;
   a winding mounted in said slots; and
   a molded plate comprising a compressed molded body of a mixture of a magnetic metal powder and an electrically insulating resin as major constituents, said molded plate being adapted to close upper portions of said slots of said annular molded body to constitute a fully closed slot structure wherein said resin forming said molded body and said molded plate comprises:
   an electrically insulated inorganic compound powder.

4. A core according to claim 3, wherein said molded plate comprises a plurality of members corresponding to said slots, respectively.

5. A core according to claim 3, wherein said molded plate comprises at least one member corresponding to said slots.

6. A core according to claim 5, wherein said molded plate comprises a single ring.

7. A core according to claim 3, wherein a resin content of said compressed molded body is not less than 1.5% by volume of a total volume of said compressed molded body.

8. A core according to claim 3, wherein the magnetic powder contained in said annular molded body has a higher volume content than that in said molded plate.

9. A core according to claim 3, wherein the magnetic metal powder contained in said annular molded body has a content of not less than 60% by volume.

10. A core according to claim 3, wherein the magnetic metal powder contained in said molded plate has a content falling in a range between 10% and 70% by volume.

11. An armature core as in claim 3, further comprising:
    a coupling agent added to the mixture of said magnetic metal powder and said resin.

12. An armature core as in claim 11, wherein said coupling agent is selected from the group of a titanium coupling agent, a silane coupling agent, an aluminum coupling agent, a zirconium coupling agent, an indium coupling agent or a chromium coupling agent.

13. An armature core as in claim 3, wherein the content of the inorganic compound powder is 2 to 70% by volume of the resin.

14. An armature core as in claim 13, wherein a particle size of the inorganic compound powder is 20 μm or less.

15. An armature core as in claim 3, wherein the content of the magnetic metal powder in the molded plate falls within the range between 10% and 70% of the total volume.

* * * * *